United States Patent [19]

Jachimowicz

[11] Patent Number: 4,563,484

[45] Date of Patent: * Jan. 7, 1986

[54] POLYURETHANE CATALYSTS

[75] Inventor: Felek Jachimowicz, Columbia, Md.

[73] Assignee: W. R. Grace & Co., New York, N.Y.

[ * ] Notice: The portion of the term of this patent subsequent to May 22, 2001 has been disclaimed.

[21] Appl. No.: 649,180

[22] Filed: Sep. 10, 1984

[51] Int. Cl.$^4$ .............................................. C08G 18/14
[52] U.S. Cl. ........................................ 521/129; 528/53
[58] Field of Search ........................... 521/129; 528/53

[56]  References Cited

U.S. PATENT DOCUMENTS

| | | | |
|---|---|---|---|
| 3,914,189 | 10/1975 | Rudner et al. | 521/127 |
| 4,186,254 | 1/1980 | Cuscurida et al. | 521/115 |
| 4,380,591 | 4/1983 | Baskent et al. | 521/115 |
| 4,450,246 | 5/1984 | Jachimowicz | 521/129 |

Primary Examiner—Maurice J. Welsh
Attorney, Agent, or Firm—Howard J. Troffkin

[57] ABSTRACT

A process for producing a polyurethane foam by reacting an organic polyisocyanate with an organic polyester polyol or polyether polyol in the presence of a catalytic amount of specific amine compounds of the formula:

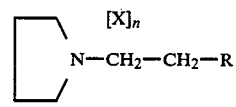

or

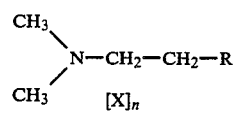

wherein R is an alkyl group selected from a $C_4$ or a $C_5$ straight or branched chain hydrocarbon, X is an organic mono or dicarboxylic acid and n is an integer from 0 to 1.

9 Claims, No Drawings

POLYURETHANE CATALYSTS

BACKGROUND OF THE INVENTION

This invention pertains to the field of urethane catalysts. More particularly, this invention relates to the use of certain specific amine compounds as urethane catalysts.

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atoms in the urethane groups. A second reaction is a cross-linking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc., is employed, but is essential if all or even part or the gas for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comprison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

Many of the catalysts used today are tertiary mono and di-amines. Among these are N,N,N',N'-tetramethylethylene diamine, N,N-dimethyl cyclohexylamine, N-methylmorpholine and the highly used bis(2-dimethylaminoethyl)ether, N-methyldicyclohexyl amine and 1,4-diazabicyclo[2.2.2] octane ("triethylene diamine"). Other typical amines used in forming polyurethanes are described in U.S. Pat. Nos. 4,012,445; 3,925,268; 3,786,005; 4,001,223; 4,048,107; 4,038,210; 4,033,911; 4,026,840; 4,022,720 and 3,912,689.

Some of the presently used tertiary amines leave a residue in the foam and thereby impart an undesirable odor to the resultant product. Still further, certain catalytic compounds, especially the alkyl tertiary amines, which meet specifications in the area of odor do not yield foams within desired tack-free time due to their low activity. The need for rapid gel, tack-free and final cure times are required in the formation of foam products in many of today's processing operations.

Commercial production of urethane foams, especially flexible foams, has undergone major change from production of domed buns to flat-top buns. Conventional domed buns normally require trimming and removal of the "dome" which translates into a 15 to 20% loss or product. Moreover, foam density and uniformity often vary and finishing costs of such doomed buns makes such processing less desirable than the newer flat-top bun process as is described in *Plastic Technology*, Vol. 24, No. 13, pages 57-62, 1978 and in *Plastics and Rubber Processing* Vol. 2, No. 11, pages 30-32, 1977, said description incorporated herein by reference.

Processing designs associated with achieving flat-top buns have placed increased demands on the chemistry of polyurethanes, particularly those related to the catalysts necessary to provide a proper balance in polymerization and blowing. It is necessary for the catalyst material or system to be capable of exhibiting a reactivity profile comprised of delayed creaming, delayed and controlled gellation/polymerization, controllable rise and rapid cure. Stated another way, the catalyst must permit gelation or viscosity build-up not to occur too quickly. Should this occur, there would be increased stress placed on the foam possibly causing splitting and/or cell collapse. Therefore, delayed action catalyst is desired since it causes less strain on the forming foam and facilitates molding the rising bun into a square shape. The foam must form in a moderate, uniform manner. Moreover, despite the slower cream and moderate rise time, the tack-free time must be suitable to permit handling of the foam in short time periods as well as to improve the physical properties of the resultant foam.

It is greatly desired to have a catalyst for forming foam polyurethanes which does not result in a product having malicious odor from the residue catalyst, which provides for the formation of a substantially uniform foam, which is capable of providing a suitable reaction profile for normal processing which produces a uniform, odor-free foam, which is capable of providing a reaction profile that is compatible with the requirements of the flat-top bun process and which is capable of forming tack-free products within a very short period of time.

SUMMARY OF THE INVENTION

The present invention is directed to the use of a specific class of tertiary amine compounds which have unexpectedly been found to provide polyurethane foam products not having malicious odor, to provide reaction profile suitable for flat-top bun processing and conventional processing and to provide foams which can be formed from conventional polyisoyantes and polyols in an accelerated manner and provide equivalent or better foam properties.

Specifically, the subject invention is directed to catalysts and a process for forming a polyurethane foam product by reacting a polyisocyanate with a polyol in the presence of a catalytic amount of a specific class of tertiary amine compound selected from a N,N- dimethyl alkylamine, or an N-alkyl pyrrolidine, or their carboxylic acid salts where the alkyl group is $CH_2-CH_2-R$ and R is a $C_4-C_5$ alkyl hydrocarbon.

DETAILED DESCRIPTION OF THE INVENTION

The process of the subject invention is directed to the formation of foams, especially flexible foams, by the reaction of a polyisocyanate with a polyol in the presence of one or a mixture of amine compounds of the general formula:

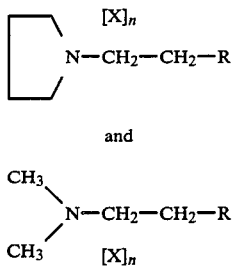

and $$CH_3\text{-}N(\text{-}CH_2\text{-}CH_2\text{-}R)\text{-}CH_3 \quad [X]_n$$

wherein R represents a $C_4$–$C_5$ alkyl hydrocarbon having a linear or branched configuration, X represents a $C_1$–$C_{12}$ mono or dibasic aliphatic or aromatic carboxylic acid capable of forming an amine salt such as, for example formic, acetic, valeric, hexanoic, adipic, glutaric, maleic, fumaric acid, benzoic acid and the like; and n is a number of from 0 to 1. When used as a catalyst component in forming domed buns by conventional modes it is preferred to use the free tertiary amine (n equals 0) or a mixture having very little salt (n being from 0 to 0.25). When using flat-top bun process it is preferred that a substantial portion of the amine be in salt form (n being up to 1 and preferably from about 0.5 to about 1). The above compounds forming the specific class of amines of the present invention unexpectedly found to provide uniquely superior catalytic activity and foam product are certain $C_6$ and $C_7$ alkyl derivatives of pyrrolidine and of dimethylamine. The other $C_6$ and $C_7$ alkyl isomers (those substituted in the alpha and/or beta carbon of the alkyl group) of pyrrolidine and of dimethylamine do not exhibit the desired combination of properties, especially of catalytic activity.

The compounds herein described possess a number of useful characteristics making them exceptionally attractive as polyurethane catalysts. For example, they have rapid catalytic activity in the polyurethane foam area. The compounds, especially in the form of amine salts, are capable of exhibiting good reaction profile to be a suitable catalyst in flat-top bun processes. The catalysts of the invention are particularly desirable in forming urethane foam products in that they provide a sufficient delay to aid in processing yet the catalysts give good foams within short desirable tack-free times. This delay time is particularly desirable in molding applications to allow sufficient time to situate the prefoam mix in the mold. The present catalysts are also attractive because they are unexpectedly capable of being retained in the mixture while foaming occurs to yield a substantially uniform foam yet do not remain in the resultant product to impart undesired odor. In addition, the compounds are easily prepared and thus provide a relatively inexpensive, cost effective catalyst material.

The subject catalyst compounds can be readily formed by conventional synthetic techniques involving the reaction of dimethyl amine or pyrrolidine with the appropriate $C_6$ or $C_7$ alkyl alcohol or halide such as for example, n-hexanol, n-hexyl halide, 3-methyl pentanol, 3-methyl pentyl halide, isohexanol, isohexyl halide, n-heptanol, n-heptyl halide, 3-methyl hexanol, 3-methyl hexyl halide and the like. The subject catalyst compounds can also be formed by conventional catalyzed aminomethylation reactions (See Journal of Organic Chemistry, 47, 445 (1982)) of dimethylamine or pyrrolidine with the corresponding $C_5$ or $C_6$ monoolefin hydrocarbon in the presence of hydrogen or water, carbon monoxide and suitable catalyst.

To prepare polyurethane foams using the present catalyst, any aromatic or aliphatic polyisocyanate may be used. Typical aromatic polyisocyanates include m-phenylene diisocyanate, p-phenylene diisocyanate, methylene diisocyanate, polymethylene diisocyanate, polyphenylisocyante, diphenylisocyanate, 2,4-toluene diisocyante, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate. Aliphatic and cycloaliphatic polyisocyanates include methylene diisocyante, hexamethylene diisocyanate, 2,2,4-trimethyl-hexamethylene diisocyanate, 2,4,4-trimethyl-hexamethylene diisocyanate, 4,4'-dicyclohexyl methane diisocyanate, isophorone diisocyanate or 3,5,5-trimethylcyclohexyl isocyanate and the like.

Preferred polyisocyanates used in the practice of the invention are the aromatic polyisocyanates and, in particular, are 2,4- and 2,6-toluene diisocyanates and methylene-bridged polyphenyl polyisocyanate mixtures which have a functionality of from about 2 to about 4. These later isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

The hydroxyl-containing polyol component which reacts with the isocyanate may suitably be a polyester polyol or a polyether polyol having a hydroxyl number ranging from about 700 to about 25, or lower. Flexible foams are best provided for when the hydroxyl number is in the range from about 25 to 60. Semi-flexible foams can be formed by using a polyol with a hydroxyl number of from about 100 to 300. Rigid polyurethanes are formed from polyols with a hydroxyl number of from about 350 to 700.

The subject amine compounds have been unexpectedly found to be a superior catalyst material in the formation of foam products expecially flexible and semi-flexible foams. The subject catalysts are especially suitable for forming flexible foams with polyether polyols using a flat-top bun process. The subject catalysts provide substantial cream time wth shorter gel and tack-free time while producing foams of good cell structure, tensile properties and stability as attained using the present commercial tertiary amines, such as triethylene diamine, used for forming these products.

When the polyol is a polyester, it is preferable to use a polyester having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. Aromatic or aliphatic acids, such as succinic acid, adipic acid, sebabic acid, azelaic acid, phthalic acid, terephthalic acid, etc., may also be employed. Aliphatic acids are preferred. The alcohol component for the polyester should preferably contain a plurality of hydroxyl groups and is preferably an aliphatic alcohol, such as ethylene glycol, glycerol, pentaerthritol, trimethylolethane, trimethylolpropane, mannitol, sorbitol, or methyl glucoside. Mixtures of two or more of the above identified alcohols may be employed also if desired. The formation of flexible polyurethane foams is best achieved by using a polyester polyol having an average functionality of from about 2 to about 4 and a molecular weight of from about 2,000 to about 6,000.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 1.05 to about 1.5 mol equivalents of isocyanate groups per mol equivalent of hydroxyl groups.

When water is used, the amount of water, based on the hydroxyl compound, is suitably within the range of about 0.01 to 0.1 mol per mol equivalent of hydroxy compound. The exact amound depending on the formulation and the cell structure desired as can readily be determined by those skilled in this art.

It is within the scope of the present invention to utilize added inert blowing agents such as a gas or gas-producing material. For example, halogenated low-boiling hydrocarbons, such as trichloromonofluoromethane and methylene dichloride, carbon dioxide, nitrogen, etc., may be used. The inert blowing agent reduces the amount of excess isocyanate and water that is normally required in preparing flexible urethane foam. Selection of the proper blowing agent is well within the knowledge of those skilled in the art. The total blowing agent (water and/or other) can be from 0.5 to 50 percent be weight based on polyol.

The subject catalysts are employed in an amount of from about 0.05 to about 4.0 weight percent based on the combined weight of the hydroxyl-containing compound and polyisocyanate. More often, the amount of catalyst used is 0.1–1.0 weight percent.

The catalysts of this invention may be used either alone or in a mixture with one or more other catalysts such as other tertiary amines and/or with an organic tin compound or other known polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, and the like wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such other tertiary amines include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylene-diamine, etc., and aliphatic polyamines, such as N,N,N',N'-tetramethyl-1,3-butanediamine.

In preparing a flexible foam, the ingredients may be simultaneously, intimately mixed with each other by the so-called "one-shot" method to provide a foam by a one-step process. In this instance, water should comprise at least a part (e.g., 10% to 100%) of the blowing agent as conventionally known to those skilled in the art.

In addition to the polyisocyanate, polyol, catalyst and possibly water, the reactants can also have other conventional formulation ingredients, such as blowing agents, foam stabilizing agents, fire retardants, etc. The blowing agent (e.g., a halogenated lower aliphatic hydrocarbon), the foam-stabilizing agent (silicone oils or emulsifiers), the fire retardant, etc., may be added to either the prepolymer or remaining polyol, or both, prior to the mixing of the component, whereby at the end of the reaction a polyurethane foam is provided.

The following examples are given for illustrative purposes only and are not meant to be a limitation on the invention as defined by the appended claims. All parts and percentages are by weight except where indicated otherwise hereinbelow.

EXAMPLE I

Polyol/polyisocyanate compositions were tested for gelation using various tertiary amines selected from various $C_6$ and $C_7$ alkyl dimethylamine and pyrrolidine catalysts of the present invention and, for comparitive purposes, other $C_6$ and $C_7$ alkyl dimethylamines and pyrrolidines having branching on the alpha or beta carbon atom. The tests were conducted according to the procedure published by J. W. Britain and P. G. Gemeinhardt, "Catalysis of Isocyanate-Hydroxy Reaction" in *Journal of Applied Polymer Science*, 4, 207–211 (1960) incorporated herein by reference.

10 parts of each of the polyols listed in Table I below were placed in test containers. Each of the various amines tested was predissolved in dioxane at known concentrations such that 1 part of solution would introduce the desired amount of amine into each of the test containers. The amines were introduced into each polyol, respectively and the test containers were sealed and heated to 70° C. with agitation. The indicated (below) amount of polyisocyante was added to the preheated polyol/catalyst/dioxane solution using a precalibrated syringe. Each test container was agitated after addition of the polyisocyanate, again sealed and replaced in the 70° C. constant temperature bath (approx, 30 sec. to complete). The gel time was measured from the time the test container was returned to the bath. The general formulation for each of the series of test samples is given in Table I. Each of the polyol series was run with each of the amines listed in Table II. The amines of the present invention are compared to their stero isomers and are shown to provide superior gel times. Time of gelation was made by observation and probe.

Table I below lists the components of each series of samples. Each series was formed using (and comparing) each of the tested amine compounds. The results for each of the amines is given in Table II below.

TABLE I

COMPOSITIONS OF GEL TEST SAMPLES IN PARTS BY WEIGHT

| | SERIES | | | | | |
|---|---|---|---|---|---|---|
| CATALYST LEVEL | I | | II | | III | |
| WT. % | 1% | 2% | 1% | 2% | 1% | 2% |
| POLYETHER 3010 | 10.00 | 10.00 | — | — | — | — |
| POLYETHER 4701 | — | — | 10.00 | 10.00 | — | — |
| POLYESTER 2403 | — | — | — | — | 10.00 | 10.00 |
| CATALYST | 0.10 | 0.20 | 0.20 | 0.20 | 0.10 | 0.20 |
| DIOXANE | 0.90 | 0.80 | 0.90 | 0.80 | 0.90 | 0.80 |
| TDI | 0.89 | 0.89 | 0.55 | 0.55 | 0.66 | 0.66 |

TABLE II

GELATION RESULTS @ 70° C., Min.

| | I | | II | | III | |
|---|---|---|---|---|---|---|
| | 1% | 2% | 1% | 2% | 1% | 2% |
| ALKYL C$_6$ DIMETHYL AMINE | | | | | | |
| (CH$_3$)$_2$N–CH$_2$CH$_2$CH$_2$CH$_2$CH$_2$CH$_3$ (n-hexyl) | 69 | 33 | 17 | 8.5 | 9 | 3.5 |
| (CH$_3$)$_2$N–CH$_2$CH$_2$CH$_2$CH(CH$_3$)$_2$ | 70 | 35 | 19 | 9 | 5.5 | 3 |
| (CH$_3$)$_2$N–CH$_2$CH$_2$CH(CH$_3$)CH$_2$CH$_3$ | 70 | 37 | 19 | 12 | 5 | 2.5 |
| comparative: (CH$_3$)$_2$N–CH$_2$-cyclopentyl | 167 | 87 | 37 | 20 | 10 | 6 |
| ALKYL C$_7$ DIMETHYL AMINE | | | | | | |
| (CH$_3$)$_2$N–CH$_2$CH$_2$CH$_2$CH$_2$CH$_2$CH$_2$CH$_3$ (n-heptyl) | 73 | 39 | 18.5 | 10 | 6.5 | 3.5 |
| (CH$_3$)$_2$N–CH$_2$CH$_2$CH(CH$_3$)CH$_2$CH$_2$CH$_3$ | 76 | 36 | 20 | 10 | 7 | 3 |
| (CH$_3$)$_2$N–CH$_2$CH$_2$CH$_2$CH(CH$_3$)CH$_2$CH$_3$ | 70 | 36 | 19 | 9 | 7 | 4 |
| comparative: (CH$_3$)$_2$N–CH$_2$CH$_2$CH$_2$CH$_2$CH=CH$_2$ | 80 | 40 | 19 | 12 | 7 | 3.5 |

TABLE II-continued

| Structure | GELATION RESULTS @ 70° C., Min. | | | | | |
|---|---|---|---|---|---|---|
| | I | | II | | III | |
| | 1% | 2% | 1% | 2% | 1% | 2% |
| (CH₃)₂N–CH₂CH₂CH(CH₃)CH=CH₂ type (dimethylamino structure shown) | 130 | 65 | 25 | 14 | 6.5 | 3.5 |
| (dimethylamino with branched alkyl) | 240+ | 240+ | 240+ | 240+ | 240+ | 240+ |
| (dimethylamino alkyl) | 95 | 46 | 20 | 11 | 5 | 3 |
| C₆ ALKYL PYRROLIDINE | | | | | | |
| pyrrolidine-N-CH₂CH₂CH₂CH(CH₃)CH=CH₂ comparative | 130 | 63 | 21 | 14 | 10 | 5 |
| pyrrolidine-N-CH₂CH(CH₃)CH(CH₃)₂ | 200 | 86 | 30 | 16 | 10 | 5 |
| C₇ ALKYL PYRROLIDINE | | | | | | |
| pyrrolidine-N-CH₂CH₂CH(CH₃)CH₂CH₂CH₃ | 110 | 52 | 20 | 10 | 5.5 | 3 |
| pyrrolidine-N-CH₂CH₂CH₂C(CH₃)=CH₂ comparative | 130 | 62 | 24 | 14 | 8 | 4 |
| pyrrolidine-N–CH₂–cyclohexyl | 240+ | 240+ | 240+ | 240+ | 240+ | 240+ |

The above gel tests show that the amine catalysts of the present invention are unexpectedly superior to other dimethyl $C_{6-7}$ alkyl amines and $C_{6-7}$ alkyl pyrrolidines in causing gelation to occur, especially with respect to polyols/polyisocyanates used to form flexible and high resiliency foams.

The following glossary is made to define the various materials used in the illustrative examples:

Polyether 3010 is a propylene oxide adduct of glycerol containing secondary hydroxyl groups (1.7 percent) and equivalent weight of about 995 (hydroxyl Number 55) used commercially to form flexible polyurethane foam.

Polyether 4701 is a polyoxypropylene-polyoxyethylene block copolymer triol having 60% primary hydroxyl groups and equivalent weight of about 1650 (hydroxyl Number 34) used commercially to form high resilient polyurethane foams.

Polyester 2403 is a primary hydroxyl containing branched product of adipic acid, diethyleneglycol, glycerol adduct used commercially to form flexible polyurethane foams.

What is claimed is:

1. A process for forming a polyurethane comprising reacting an organic polyisocyanate with a polyol selected from an organic polyether polyol or polyester polyol in the presence of a catalytic amount of an amine selected from the group having the structural formula:

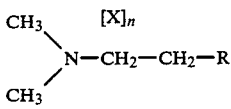

or

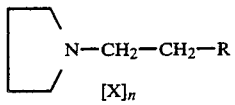

wherein R is an alkyl group selected from a $C_4$ or a $C_5$ hydrocarbon, X is an organic mono or dicarboxylic acid and n is a number from 0 to about 1.

2. The process of claim 1 wherein R is a $C_{4-5}$ straight chain alkyl group and n is 0.

3. The process of claim 1 wherein R is a $C_{4-5}$ straight chain alkyl group and n is a number up to 1.

4. The process of claim 3 wherein X is selected from formic acid, adipic acid, fumaric acid, 2-ethyl hexanoic acid and mixtures thereof.

5. The process of claim 1 wherein the catalyst is present in from about 0.05 to 5 percent by weight based on the weight of polyol present.

6. The process of claim 2 wherein the catalyst is present in from about 0.05 to 5 percent by weight based on the weight of polyol present.

7. The process of claim 4 wherein the catalyst is present in from about 0.05 to 5 percent by weight based on the weight of polyol present.

8. The process of claim 5 wherein the catalyst is present in from about 0.05 to 5 percent by weight based on the weight of polyol present.

9. The process of claim 3 wherein said reaction of polyol and polyisocyanate is carried out in a reaction zone suitable for forming a flat-top bun product.

* * * * *